United States Patent
Reubold (10) Patent No.: US 11,392,514 B2
(45) Date of Patent: Jul. 19, 2022

(54) DATA PROCESSING APPARATUS HAVING MULTIPLE PROCESSORS AND MULTIPLE INTERFACES

(71) Applicant: Rockwell Collins Deutschland GmbH, Heidelberg (DE)

(72) Inventor: Timo Reubold, Eberbach (DE)

(73) Assignee: ROCKWELL COLLINS DEUTSCHLAND GMBH, Heidelberg (DE)

( * ) Notice: Subject to any disclaimer, the term of this patent is extended or adjusted under 35 U.S.C. 154(b) by 0 days.

(21) Appl. No.: 17/280,572

(22) PCT Filed: Jul. 18, 2019

(86) PCT No.: PCT/EP2019/069362
§ 371 (c)(1),
(2) Date: Mar. 26, 2021

(87) PCT Pub. No.: WO2020/064168
PCT Pub. Date: Apr. 2, 2020

(65) Prior Publication Data
US 2022/0092000 A1    Mar. 24, 2022

(30) Foreign Application Priority Data
Sep. 28, 2018  (DE) .......................... 102018124106.2

(51) Int. Cl.
*G06F 13/38*   (2006.01)
*G06F 13/12*   (2006.01)
(Continued)

(52) U.S. Cl.
CPC .............. *G06F 13/124* (2013.01); *G06F 9/28* (2013.01); *G06F 9/3885* (2013.01)

(58) Field of Classification Search
None
See application file for complete search history.

(56) References Cited

U.S. PATENT DOCUMENTS 9,098,462 B1   8/2015   McNicholl et al.
9,137,038 B1   9/2015   Mazuk et al.
(Continued)

FOREIGN PATENT DOCUMENTS

| EP | 3098718 A1 | 11/2016 |
| JP | 2003067350 A | 3/2003 |
| JP | 2003099388 A | 4/2003 |

OTHER PUBLICATIONS

Mustacchi, Robert, "Turtles on the wire: understanding how the OS uses the modern NIC", Sep. 15, 2016.
(Continued)

*Primary Examiner* — Hyun Nam
(74) *Attorney, Agent, or Firm* — Murphy, Bilak & Homiller, PLLC (57) ABSTRACT

A data processing apparatus is specified, having multiple processor devices (4), multiple interface devices (5), to which external devices (E) are respectively connectable, and having connections (8, 10) between the interface devices (5) and the processor devices (4), via which data are transportable between the interface devices (5) and the processor devices (4). In the connections (8, 10), there is provision for at least one data management device (20) for handling data flows between the interface devices (5) and the processor devices (4). The data management device (20) is in the form of a hardware component.

3 Claims, 4 Drawing Sheets

(51) Int. Cl.
*G06F 9/28* (2006.01)
*G06F 9/38* (2018.01)

(56) References Cited

U.S. PATENT DOCUMENTS

| | | | |
|---|---|---|---|
| 9,268,797 B2* | 2/2016 | Whitehead | G06F 11/1402 |
| 11,263,666 B2* | 3/2022 | Peter | G06F 16/00 |
| 2006/0123071 A1 | 6/2006 | Sonoda et al. | |
| 2012/0278508 A1* | 11/2012 | Lu | G06F 13/385 |
| | | | 710/6 |
| 2013/0159449 A1* | 6/2013 | Taylor | G06F 15/167 |
| | | | 709/212 |
| 2014/0032940 A1* | 1/2014 | Sartirana | G06F 16/183 |
| | | | 709/225 |
| 2016/0179730 A1* | 6/2016 | Halleck | G06F 13/124 |
| | | | 710/105 |
| 2017/0302587 A1 | 10/2017 | Houyou et al. | |
| 2018/0165237 A1* | 6/2018 | Wu | G06F 13/385 |
| 2019/0227805 A1* | 7/2019 | Carlson | G06F 9/3836 |
| 2019/0370212 A1* | 12/2019 | Miller | G06F 15/17 |
| 2022/0091761 A1* | 3/2022 | Patel | G06F 3/0629 |
| 2022/0092000 A1* | 3/2022 | Reubold | G06F 9/28 |

OTHER PUBLICATIONS

Willmann, Paul, et al., "Concurrent Direct Network Access for Virtual Machine Monitors", IEEE 13th International Symposium on High Performance Computer Architecture, Scottsdale, AZ, USA, 2007, pp. 306-317.

* cited by examiner

DATA PROCESSING APPARATUS HAVING MULTIPLE PROCESSORS AND MULTIPLE INTERFACES

The invention relates to a data processing apparatus having multiple processor devices and multiple interface devices, in particular, a data processing apparatus for use in avionics.

Avionics usually designates the entirety of the electrical and electronic equipment used aboard an airplane. Following the development of modern microelectronics, also the integration of more and more functionalities into smaller, more powerful and more efficient avionics computer systems is rapidly progressing. The particularity with avionics computer systems is that generally they must be subjected to time-consuming and elaborate approval procedures. Only after an approval has been granted, corresponding components can be used in aviation, e.g. in airplanes or avionics equipment. As a result, alterations in the components can only occur very slowly and reluctantly.

In computer systems common in avionics, processors are most of the time provided on which individual applications can run. The processors are coupled to interfaces which, in turn, can be coupled to other equipment, for example, measuring equipment or sensors.

Due to the aforementioned long approval procedures, it may happen in practice that, in particular, the interfaces must be used unaltered with regard to their structure or with regard to their definitions over decades. Each alteration of an interface or even a new definition of an interface would be enormously elaborate and will therefore only be reasonable if the benefit outweighs the high expense.

Multiple existing sub-systems will often be replaced by individual highly integrated equipment on existing flight platforms in the course of modernization programs. The existing functionality can, in this process, be expanded with additional features.

Figure 1:
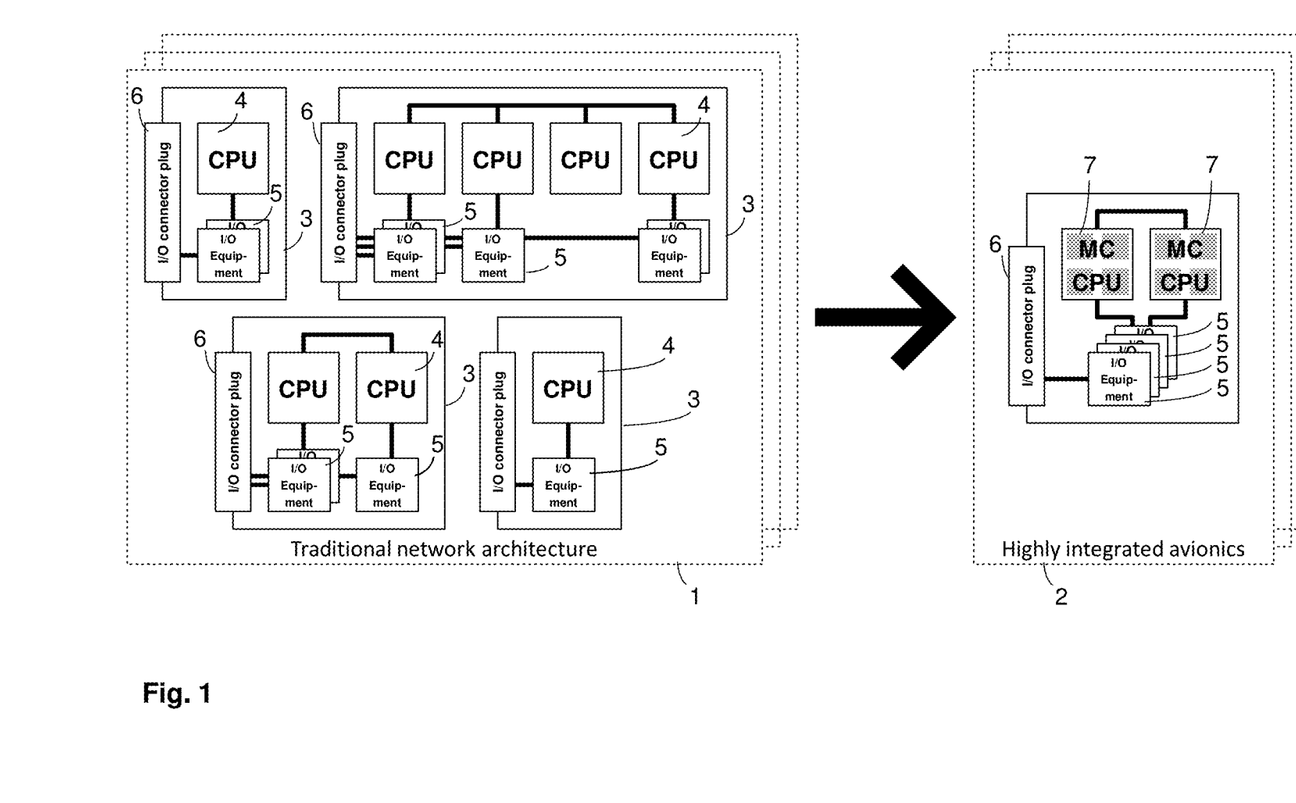
FIG. 1 shows a schematic example of the consolidation of older computer systems to new computer architectures.

FIG. 1 shows schematically the typical development in avionics systems. The left part of the image shows a traditional network architecture 1 which is to be further developed into highly integrated avionics 2 in the course of the modernization.

The traditional network architecture 1 is characterized in that a multitude of individual computer systems 3 exists, with each computer system 3 having one or more processors 4 and interfaces 5 connected to the processors 4. The interfaces 5 can, in turn, be coupled to appropriate connectors 6, for example, connector plugs or sockets, in order to be able to connect the external equipment.

In the course of the modernization, such complex and diverse systems are to be further integrated, as shown in the right part of the image of FIG. 1. In this process, it is endeavored to make modern multicore processors 7 in avionics also unrestrictedly usable for safety-critical applications.

As a result, a highly parallel computer architecture is created on which a multitude of most different applications (software) in several contexts can be executed at the same time. In this process, the applications or contexts are to share a defined amount of physical resources (hardware). In particular, also a multitude of input and output interfaces (I/O interfaces) of the computer sub-system usually belongs to such physical resources.

One problem is to achieve a preferably flexible I/O architecture, with which the integration of (longtime) established, but also new or even future interface standards can be enabled. This should preferably be standardized and made efficiently usable for a certified multicore computer sub-system.

In avionics, there is, with regard to well-known systems, a fixed allocation of physical interfaces to an individual software application, a processor core or a processor, respectively. This highly restricts the scalability and flexibility of existing sub-systems. If more than one interface of a certain type is to be implemented by means of, for example, an application-specific integrated circuit (IC), allocation of the integrated circuit and the functionality associated therewith to an individual processor core and to the associated driver and application software context is made. A certain flexibility can, in this process, be achieved with the aid of an I/O server software. However, no satisfying solutions are achieved, especially with regard to the complex exchange relationships between additive latency, high complexity of the process planning, multiple data copying processes and the computing time requirement. Such approaches are therefore frequently very complex or very latency afflicted.

Data are usually exchanged between the interfaces (I/O hardware) and the software layers in that the relevant software application requests data. As a result of this request, data are, via periphery interfaces (for example, PCI Express), either directly taken from memories allocated to the interfaces or provided in the relevant memory for transmission.

Frequently, also further dedicated hardware is used to organize the data transport between the periphery and the main memory and relieve the software application in this manner (for example, with the aid of a processor DMA controller).

Figure 2:
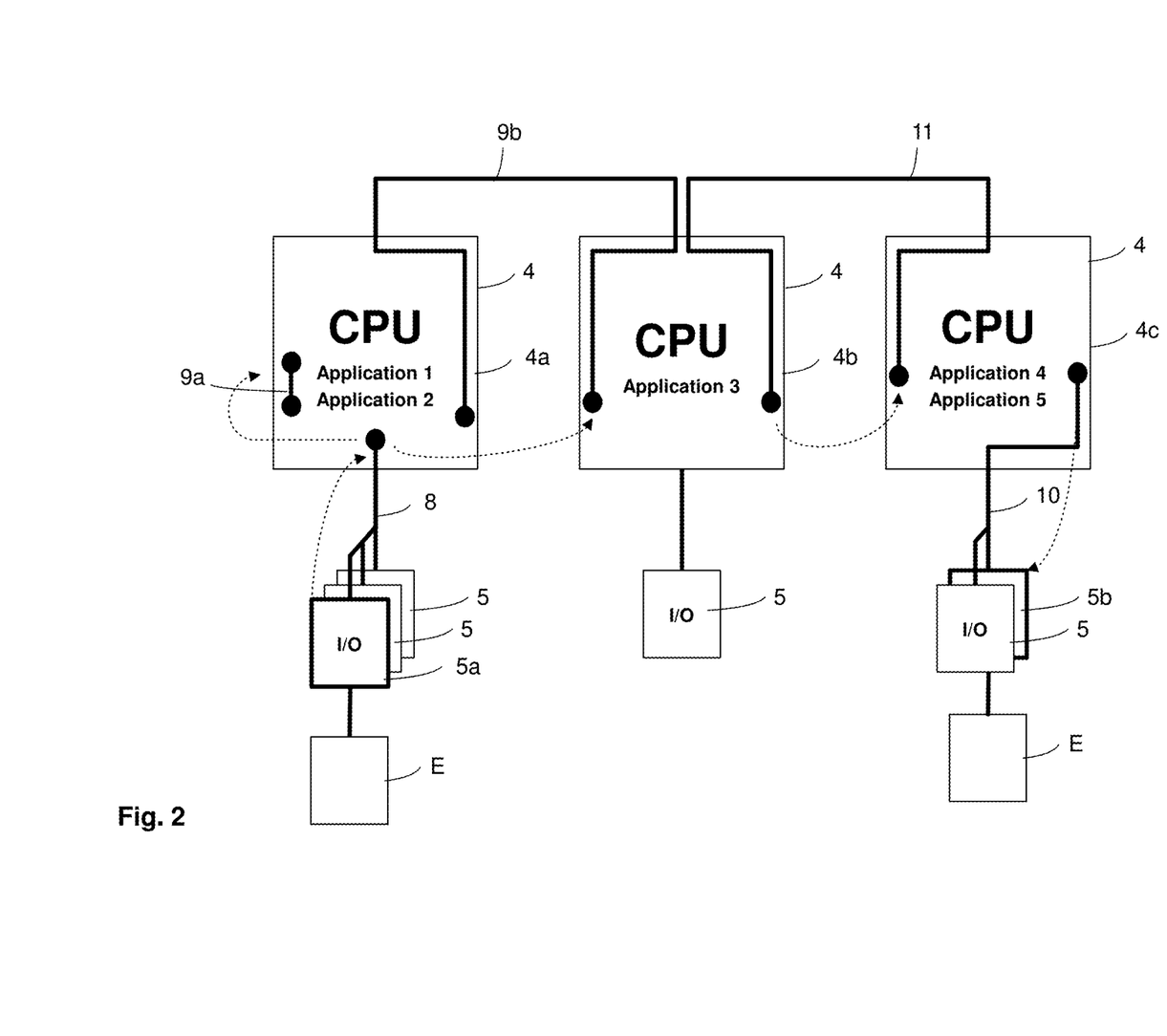
FIG. 2 shows the principal structure of a data processing apparatus according to the prior art.

FIG. 2 shows an abstract example of a typical well-known implementation of a computer system in avionics having multiple interfaces which are jointly used by applications (software applications) on multiple processors.

In the present example, three processors 4 are shown on which a total of five different applications run. For a better differentiation, the processors are marked with reference numerals 4a, 4b and 4c. The interfaces 5 described herein in more detail for explanation are marked with reference numerals 5a and 5b.

The interfaces 5 or 5a, 5b can be coupled to external devices E not shown, for example, other equipment, sensors, relays, valves, electric motors, etc.

In the present example, data are, via the interface 5a, supplied from the external device E and from there transferred to the processor 4a via a connection 8. In particular, the data flows from the interface 5a to the application 2 which runs on the processor 4a. The application 2 controls the interface 5a and therefore also the data flow.

Furthermore, the application 2 shares the incoming data with the application 1, which also runs on the processor 4a, and the application 3, which runs on another processor, namely the processor 4b.

The data flows created in this process are marked by connections 9a (between application 2 and application 1) and 9b (between application 2 and application 3).

Also latencies are, in each case, connected to the data flows which can include different time periods. Reading data from the interface 5a by the application 2 typically takes less than 1 ms. This also applies to copying data from the application 2 to the application 1 via the connection 9a within the processor 4a.

Copying, in contrast, from the processor 4a to the processor 4b, namely from the application 2 to the application 3, can be much more time-consuming and typically be less than 40 ms.

Another data flow is shown in the right part of the image of FIG. 2. In this figure, data are to be outputted to an external device E via the interface 5b. The interface 5b is controlled by the application 4 via a connection 10. Since data of the application 3 are to be outputted via the interface 5b, the application 4 on the processor 4c makes available the interface 5b for the application 3 on the other processor 4b for transmitting data. For this purpose, an additional connection 11 exists between the application 3 and the application 4.

For this process, data must therefore be copied again between two processors (here: processors 4b and 4c), which can lead to latency times of <40 ms. Writing into the interface 5b by the application 4 (software) is typically <1 ms.

The typical latency times mentioned herein can, in particular, occur through the software data transfer, copying processes and an asynchronous software process planning between individual processors. The latency times or their underlying processes are marked by dashed arrows in FIG. 2.

The invention is based on the object to improve a thus described avionics data processing apparatus on one hand with regard to its flexibility and, on the other hand, the data flow speeds or reduction of the latency times.

The object is, in accordance with the invention, achieved by a data processing apparatus having the features of claim 1. Advantageous embodiments are specified in the dependent claims. The data processing apparatus according to the invention can, in particular, be used advantageously in avionics computer systems.

A data processing apparatus is provided, comprising multiple processors, multiple interfaces to which external devices can each be connected, and comprising connections between the interfaces and the processors, via which data can be transported between the interfaces and the processors, wherein at least one data management device for handling data flows between the interfaces and the processors is provided in the connections.

Thus, in contrast to well-known data processing apparatus, a data management device which is to handle the data flows is, in the data processing apparatus, additionally provided in the connections between the interfaces and the processors. In particular, the processors and the software applications running thereon are thereby relieved of data handling tasks and the efficiency is increased.

The external devices mentioned are typically equipment, sensors, motors, valves, switches, light elements, air conditioning components, etc. which, e.g., are used in aviation and which can be connected to the interfaces. These external devices are therefore not part of the specified data processing apparatus. Rather, the system boundary of the described data processing apparatus is such that the connectable external devices are thereby not detected.

The processors are processor devices which can be built in a well-known manner and can, in particular, include one or more main processors or processor cores (CPU), control or tail units, arithmetic units, registers, data lines (data buses), caches and a memory management unit (MMU). The term "processor" therefore does not comprise the actual processor alone, but naturally also the memory areas coupled to the processor (for example, the main memory) which are required for the operation of the processor.

The interfaces can be diversely designed interface devices which are, in particular, configured as hardware interfaces in order to couple equipment intended for aviation to one or more processors. Accordingly, they can, e.g., be configured as analog or digital, parallel or serial interfaces, etc.

Accordingly, the interfaces can include various different types of interfaces, for example, discrete interfaces (28V, GND Open, 12V, 5V, TTL, PWM), analog interfaces (current, voltage, frequency), serial interfaces, digital interfaces, etc. The interfaces can also include multiple traditional discrete (analog, digital), serial (ARINC-429, RS-422, etc.), bus (MIL-STD-1553, CAN, STANAG-3910, etc.) and modern network interfaces (Ethernet, AFDX, Fiber Channel, etc.).

The connections mentioned can, on one hand, exist between processors and interfaces and, on the other hand, also directly between the processors.

E.g., as explained above in connection with FIG. 1, multiple processor devices can be provided in an avionics computer system in which multi-core processors are operated, on which software applications run which must universally access the interfaces.

The data management device is therefore provided separately from and additionally to the interfaces and processors. Thus, it is possible that the interfaces and processors need not be structurally altered, which can simplify and accelerate corresponding approval procedures.

Handling data flows includes, in particular, carrying out measures usually associated therewith such as managing, sorting, transferring incoming and outgoing data.

Depending on the complexity of the data processing apparatus, also multiple data management devices can be used, which are each allocated to the interfaces and which handle the data flows from and to the interfaces.

The interfaces can be configured to receive data from external devices that can be connected to the interfaces and/or transmit data to external devices that can be connected to the interfaces. The interfaces can therefore perform receiving and transmitting data in the usual manner.

At least one of the interfaces can therefore be configured to receive data from an external device that can be connected to the interface, and at least one of the interfaces can be configured to transmit data to an external device that can be connected to the interface.

The data management device can be configured as a hardware component. This means that data are not managed through software and therefore, in particular, not by using applications running on the processors, but that the data management device represents a hardware component of its own. In particular, the data management device can be configured as an integrated circuit (IC).

The hardware component or the integrated circuit can be configured modularly and/or logically distinct from the processors and the interfaces. The hardware component can therefore be configured structurally distinct from the processors and the interfaces and represent a component of its own, so that the processors and the interfaces need not be structurally arranged, whereby the approval procedures are simplified. Similarly, it is possible that, e.g., the hardware component is implemented on a system-on-chip where all components are jointly integrated on a single chip with, however, logical distinctiveness of the hardware component from the other components (processors, interfaces) being given.

The hardware component can be directly connected to at least one part of the interfaces. In this manner, fast exchange of data is possible.

The processors can include memory areas for storing data, where the data management device can be configured to handle data flows to memory areas of the processors. In this process, physical memory areas can, in particular, be defined for applications that run on the processors. These memory areas are usually in the main memory, where the data stored therein can be used by the relevant applications. In addition, the memory areas can be directly controlled by the data management device without using the relevant applications. The applications are thereby relieved and latency times significantly reduced. The data management device can therefore write data directly into the physical memory areas or read data from them.

In this process, the use of the main memory (i.e. the processor RAM) is particularly advantageous. For example, a memory can also be physically allocated as an external device via an interface. However, it can then only be accessed by the processor by means of this peripheral interface, whereby significant latencies can be effected.

The main memory, however, can be accessed by the processor in a fast and low latency manner, which is not the case with a memory that is allocated to external equipment.

At least one of the processor devices can have one or more processor cores. Similarly, it is possible that a computer system includes at least one or more processor devices.

The data processing apparatus can be used in avionics computer systems in a particularly advantageous manner.

The data management device, in the form of an integrated circuit (hardware), takes over the sorting and transferring of incoming and outgoing data on multiple allocated avionics I/O interfaces of a different type completely autonomous. This largely occurs without a constant control effort and data transport by the software running in the processors.

The received data, which are received via the interfaces, are made available by the data management device to multiple software applications independent of one another directly within the processor main memory. Data that are to be transferred outwards to external devices by the software are collected from the processor main memory by the data management device. In this process, the data are transferred between an interface and a processor main memory without active participation of a software application running on the processor.

Due to an appropriate memory access management (processor and operating system configuration), a conflict-free and safe common usage of the data management device (of the integrated circuit), of the implemented interfaces and of all received and transmitted data through multiple software applications at the same time is enabled. The software applications can, in this process, be executed in parallel on one or more processor cores or on one or more multi-core processors.

Independent of the type of interface, the same generic approach can be used for a robust and synchronized data exchange between the hardware (the data management device) and the software (the applications running on the processors). In this process, data structures can be used that are compatible with the industrial standard. This, for example, relates to well-known systems such as PCI-Express or Rapid-I/O. The data structures can use ring buffers in connection with an appropriate synchronization model (producer, consumer, semaphore) and a communication model (packet-based memory transfer, direct memory access [DMA]).

Due to the use of components that are substantially compatible with the industrial standard, the expenditure for approval procedures as part of safety-critical avionics is manageable without flexibility and efficiency being restricted.

With the aid of the data processing apparatus, standardization of the mechanism of inputting and outputting data independently of the type of the interface used is possible. Due to the relief of the software applications in terms of hardware, an increase in the efficiency of the software execution is possible. Relieving the software of inputting and outputting activities leads to a reduction of the interference with the software execution, which leads to easy demonstration of the determinism critical for questions of approval.

The data processing apparatus is a robust model with which different interfaces can be jointly used by different applications at the same time without additive latency.

The apparatus enables a very good scalability of traditional systems with individual processors up to modern systems with one or more multi-core processors.

Figure 3:
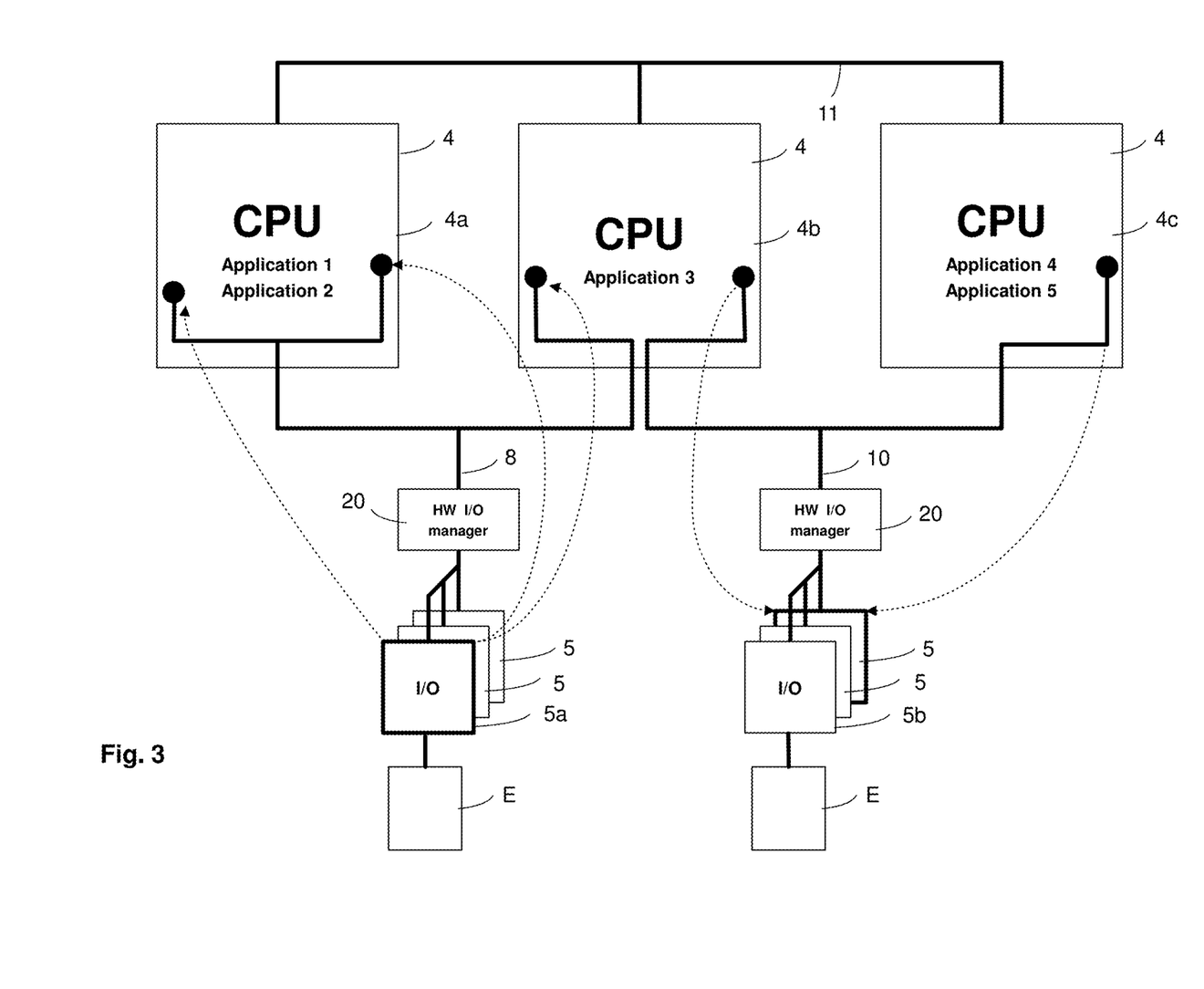
FIG. 3 shows a schematic representation of a data processing apparatus according to the invention.

These and additional advantages and features are explained in the following text, based on an example with the aid of the accompanying figures, in which:

FIG. 3 shows the schematic structure of a data processing apparatus according to the invention, which can, for example, be part of a computer system. Components which are similar to the components described above in connection with FIG. 2 regarding the prior art or can be identical to them are marked with the same reference numerals.

It thus emerges that, in contrast to the data processing apparatus of FIG. 2, at least one additional data management device 20 is provided in the connection 8 between the interfaces 5 and the processors 4 in the data processing apparatus according to the invention of FIG. 3. In the example shown in FIG. 3, two data management devices 20 (HW I/O manager-hardware) are used. Other variants can also be equipped with only one data management device 20 or with multiple data management devices.

The data management device 20 handles the data flow between the different interface devices 5 and the applications running on the processors 4. In particular, the data management device 20 is implemented as hardware, e.g. in the form of an integrated circuit (HW I/O manager).

The data management device 20 takes over the interface management and the data transport, whereby significantly lower latency times are possible, as explained later. The significantly lower latency times are mainly based on the virtualization of the interfaces through the data management device, the direct common usage of a processor main memory to be explained later, and the autonomous sorting and transferring of incoming and outgoing data through the data management device 20.

In the concrete example shown in FIG. 3, the data management device 20 receives data from the interface 5a which, in turn, is connected to an external device E, and writes them directly into the main memory areas which are used in the processor 4a by the applications 1 and 2. In contrast to the example of FIG. 2 known from the prior art, it is therefore not required that—unlike in FIG. 2—an application (in FIG. 2: application 2) receives data and must copy such data for the use by another application (in FIG. 2: application 1). Rather, the data management device 20 makes the data available to both applications 1 and 2 at the same time.

In addition, the data received via the interface 5a are also written directly into the main memory area of the application 3, so that also therein elaborate copying processes (copying data from application 2 to application 3 in FIG. 2) are omitted.

For this purpose, fixed physical connections, in particular, for the data management device 20, to the relevant memory areas are defined which ideally also remain unaltered in operation. The data management device 20 therefore "knows" exactly which data must be written into which memory areas of the processors 4.

The data flows therefore occur via the connection 8 between the (receiving) interface 5a and the memory areas of the applications 1 and 2 for the processor 4a and the memory area of the application 3 on the processor 4b.

For the writing processes by the data management device 20 extremely short latency times result. These are typically less than 5 µs. For comparison: for the reading and copying processes of the apparatus of FIG. 2, significantly longer latency times in the range of milliseconds were required. The latency times or their underlying processes are marked by dashed arrows in FIG. 3.

An example of transmitting data from the applications 3 and 4 is explained in the right part of the image of FIG. 3. Here the data management device 20 (shown in FIG. 3 in the right part of the image) directly accesses the memory areas of the applications 3 and 4 and transfers the data read therein directly to the interface 5b.

The data flow therefore occurs from the application 3 in the processor 4b via the connection 10 and the application 4 in the processor 4c to the (transmitting) interface 5b via the data management device 20.

Here, too, the occurring latency times are very short and are typically less than 10 µs.

In addition, the processors 4 can be connected among one another via connections 11 in the usual manner.

The processors 4 shown in FIG. 3 can, in each case, have a processor core ("CPU") as well as the associated memory hierarchy and memory management. If the processors 4 are part of multi-core processors (cf., e.g., the multi-core processors 7 in FIG. 1), it is also possible that the processor cores (CPU) share the memory management with other processor cores (CPU) which are part of the multi-core processor in question. In this connection, it is added, with reference to FIG. 1, that in each case four processor cores (correspondingly, "CPU" in FIG. 3) are shown for the multi-core processors 7 shown therein by way of example. Of course, the multi-core processors 7 can be structured differently.

Accordingly, the processors 4a and 4b can, e.g., be part of a first multi-core processor and the processor 4c can be part of another multi-core processor in the example of FIG. 3.

Figure 4:
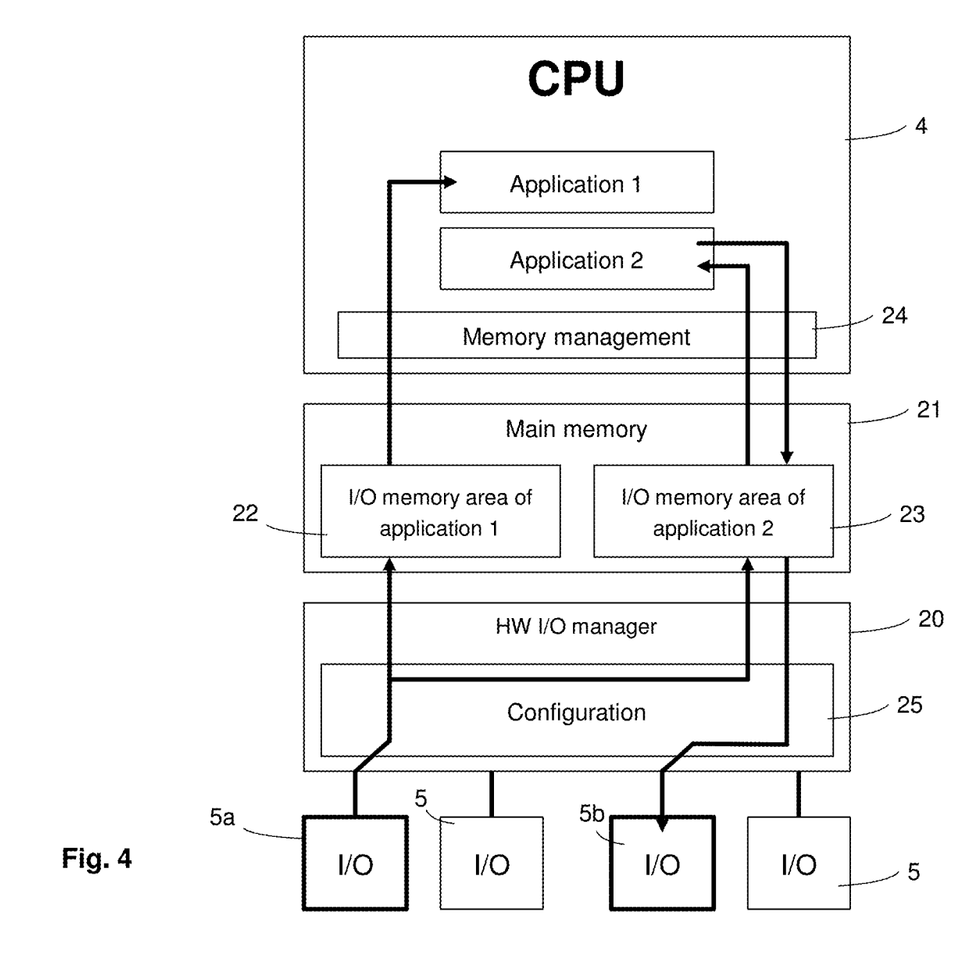
FIG. 4 shows a detailed representation of the memory management.

FIG. 4 shows, in more detail, an example of another application in order to be able to better explain the data flows and memory access.

In this figure, the representation of the actual main processor 4 is separate from a main memory 21 allocated to the processor 4. In the representations in FIGS. 2 and 3, the relevant main memory has not been shown separately, but shown as part of the processor 4 (more correctly: processor device consisting of the actual processors and required further components such as memory areas, etc.).

The applications 1 and 2, to which memory areas 22 (for application 1) and 23 (for application 2) are respectively allocated, run in the processor 4. The memory areas 22, 23 are managed by a memory management 24 in a known manner.

The data management device 20 (HW I/O manager) has an appropriate configuration 25 which enables it to handle the interfaces 5 or 5a, 5b allocated to it in a defined manner in each case and the data flows associated therewith. In particular, the data management device 20 "knows" which data from which interface 5 must be written into which memory areas 22, 23 in the main memory 21 or must be read from there and transmitted.

In the example shown in FIG. 4, the received data are written into the memory areas 22 (for application 1) and 23 (for application 2) by the data management device 20 via the (receiving) interface 5a, as has already been explained based on FIG. 3. The applications 1 and 2, in turn, have direct access to the memory areas 22 and 23.

Data to be outputted are, in the example shown, written into the memory area 23 by the application 2 and from there read by the data management device 20 and routed to the interface 5b.

FIG. 4 only shows the structure of a highly simplified system. In more complex systems, it is, for example, possible that multiple processor cores ("CPU") share a common memory management and a common main memory (e.g. in multi-core processors). The data management device 20 can, in turn, be coupled to multiple multi-core processors.

The invention claimed is:

1. An avionics computer system comprising a data processing apparatus, comprising:
   a plurality of processor devices, wherein at least one of the processor devices has one or more processor cores on which multiple software applications can be executed in parallel;
   a plurality of interface devices configured for connection to external devices; and
   connections between the interface devices and the processor devices, via which data can be transported between the interface devices and the processor devices,
   wherein at least one data management device configured to handle data flows between the interface devices and the processor devices is provided in the connections,
   wherein the processor devices have memory areas configured to store data,
   wherein the memory areas are each coupled to the processor cores,
   wherein the at least one data management device is configured to handle data flows to the memory areas of the processor devices,
   wherein the memory areas are directly controllable by the at least one data management device, such that the at least one data management device can write data into or read data from physical memory areas that are firmly defined for relevant applications,
   wherein the at least one data management device is configured as a hardware component,
   wherein the hardware component is configured modularly and/or logically distinct from the processor devices and the interface devices,
   wherein the hardware component is directly connected to at least one part of the interface devices,
   wherein data can flow between the data management device and the interface devices and between the at least one data management device and the processor devices using separated connections.

2. The avionics computer system of claim 1, wherein the interface devices are configured to receive data from external devices that can be connected to the interface devices, and/or transmit data to external devices that can be connected to the interface devices.

3. The avionics computer system of claim 1, wherein at least one of the interface devices is configured to receive data from an external device that can be connected to the interface device, and wherein at least one of the interface devices is configured to transmit data to an external device that can be connected to the interface device.

* * * * *